United States Patent [19]

Storath et al.

[11] Patent Number: 4,777,414

[45] Date of Patent: Oct. 11, 1988

[54] DRIVING ARRANGEMENT FOR A DRIVE MOTOR

[75] Inventors: Albrecht Storath, Niederlauer; Hartmut Vogt, Herzogenaurach, both of Fed. Rep. of Germany

[73] Assignee: Siemens Aktiengesellschaft, Berlin and Munich, Fed. Rep. of Germany

[21] Appl. No.: 100,974

[22] Filed: Sep. 25, 1987

[30] Foreign Application Priority Data

Sep. 26, 1986 [DE] Fed. Rep. of Germany ....... 3632837
Feb. 6, 1987 [DE] Fed. Rep. of Germany ....... 3703692

[51] Int. Cl.$^4$ ........................ H02P 5/40; H02K 19/10
[52] U.S. Cl. ................................... 318/138; 318/254; 318/722; 318/724
[58] Field of Search ............... 318/721, 722, 723, 138, 318/254, 724

[56] References Cited

U.S. PATENT DOCUMENTS

| | | | |
|---|---|---|---|
| 3,775,649 | 11/1973 | Bayer et al. | 318/721 |
| 4,023,083 | 5/1977 | Plunkett | 318/807 |
| 4,208,621 | 6/1980 | Hipkins et al. | 318/138 |

*Primary Examiner*—David Smith, Jr.
*Attorney, Agent, or Firm*—Kenyon & Kenyon

[57] ABSTRACT

The disclosure is related to a driving arrangement for a drive motor which is provided with an electronic power stage (9) which is controlled by a current controller (13). During the commutation phase, a breakdown of the torque occurs in such drive motors due to the shape of the B-field current, so that the torque has a wavy shape. The torque breakdown can be counteracted by raising the load current in the commutation region. This raising of the load current during the commutation phase is achieved by the provision that the current reference value of the current controller (13) is increased correspondingly by means of an auxiliary voltage at the respective commutation instant.

11 Claims, 6 Drawing Sheets

DRIVING ARRANGEMENT FOR A DRIVE MOTOR

BACKGROUND AND SUMMARY OF THE INVENTION

The invention relates to a driving arrangement for a drive motor with which at least one current controller is associated. The current controller controls semiconductor switching elements of an electronic power stage associated with the drive motor in dependence on a rotor position transmitter coupled to the rotor of the drive motor.

Such a driving arrangement is known from DE-OS No. 31 20 559. In such driving arrangements, a wavy course of the torque is obtained because of the shape of the B-field curve. A breakdown of the torque occurs at every commutation process.

It is an object of the present invention to develop a driving arrangement of the type described at the outset in such a manner that the breakdown of the torque is substantially reduced to thereby decrease torque ripple.

According to the invention, the stated problem can be solved by providing a number of auxiliary windings corresponding to the number of phases of the drive motor. The auxiliary windings are associated with a magnetically excited rotor, the pole position of which agrees with the rotor position transmitter. The auxiliary windings are arranged at a physical spacing of 360°/2 pm relative to one another, where p corresponds to the number of pole pairs of the drive motor and m corresponds to the number of phases of the drive motor. The auxiliary voltage induced in the auxiliary winding is superimposed after rectification to the current reference value as a supplementary reference value. Due to the described arrangement of the auxiliary windings, a non-sinusoidal auxiliary voltage is induced therein which has a pronounced maximum at each commutation instant. Due to the fact that this auxiliary voltage is superimposed on the current reference value, the current reference value has, at every commutation instant, a value which is increased by an amount corresponding to the maximum of the auxiliary voltage occurring at that instant. Accordingly, the load current of the drive motor is controlled-upwardly according to the course of the current reference value at the instant of commutation.

A further solution of the problem comprises, in a driving arrangement, in which a tachometer generator is connected to the motor rotor. The tachometer generator comprises a multiphase stator winding of which the number of phases corresponds to the number of phases of the drive motor and is designed so that in each phase of the stator winding, a voltage which is constant at least over a given angular range is induced and the angular regions in which the individual phase voltages change from one polarity to the other do not overlap in time. The individual phase voltages are added up by means of a summing stage to form an auxiliary voltage which is subtracted amplitude-wise from the current reference value of the current controller. Due to the described course of the phase voltages of the tachometer generator, an auxiliary voltage is obtained by adding them up which has a pronounced minimum at each commutation instant. Due to the fact that this auxiliary voltage is subtracted as far as the magnitude is concerned, from the current reference value, the current reference value has at every commutation instant an increased value according to the minimum of the auxiliary voltage occurring at this instant, so that also in this case, the load current of the drive motor is controlled-upwardly according to the course of the current reference value at the instant of commutation.

In both solutions, the torque breakdown caused by the drop of the field curve in the commutation region by the load current, which is larger at the commutation instant, is reduced substantially so that the torque ripple is decreased.

Due to the fact that the auxiliary windings are arranged in the stator of the drive motor and are induced by the rotor field of the drive motor, a separate machine unit for generating the auxiliary voltage become unnecessary. In a driving arrangement with a speed control superimposed on the current controller, a tachometer generator coupled to the drive motor is required for setting the actual speed value. In this case, the auxiliary windings can be arranged in the stator of the tachometer generator and can be induced by the rotor field of the tachometer generator.

Since a number of auxiliary windings corresponding to the number of phases of the drive motor is provided and the auxiliary voltage must be rectified, a correspondingly large amount of rectifier elements results. This cost can be reduced by connecting all auxiliary windings in series. By this series connection of the auxiliary windings, a single auxiliary voltage is obtained, the frequency of which is a multiple corresponding to the number of the auxiliary windings of the frequency of an individual auxiliary winding. Thus, also this single auxiliary winding has a maximum at every commutation instant, by which the current reference value is then increased accordingly. Since only a single auxiliary voltage still need to be rectified, the amount of rectifier elements and also of control lines, is reduced.

The magnitude of the voltage induced in the auxiliary windings is proportional to the speed of rotation of the drive motor or of the tachometer generator coupled thereto. For raising the current reference value, however, a value as constant as possible is required. A constant value of the auxiliary voltage which is independent of speed variations and which is to be superimposed on the current reference value is achieved by the provision that the auxiliary voltage furnished by the tachometer generator is matched as to its amplitude to the level of the actual speed value and both voltages are fed to the inputs of a divider stage in such a manner that the auxiliary voltage is divided by the actual speed value voltage. Furthermore the output of the divider stage is connected to one input of a multiplier stage, at the other input of which the current reference value is present and the output of which is connected to a comparator stage which precedes the current controller and carries out the reference/actual value comparison.

The matching of the auxiliary voltage to the magnitude of the actual speed value voltage can be accomplished by designing the auxiliary windings in such a manner that the crest value of the auxiliary voltage is approximately equal to the level of the actual speed voltage or also by feeding the auxiliary voltage to the divider stage via a normalizing stage.

By the normalizing stage, the value of the auxiliary voltage is matched to the value of the actual speed voltage. By matching the voltage maximum of the auxiliary voltage to the level of the actual speed value voltage and the formation of the quotient of the two voltages a constant control variable independent of the absolute magnitude of these voltages is obtained at the instant of the voltage maximum of the auxiliary voltage. Thereby, the current reference value is always increased by the same value in the commutation region, independent of the speed.

Due to the fact that in a driving arrangement with a three-phase drive motor, the angular range in which the individual phase voltages of the tachometer generator are constant, extends over 120°, a triangular waveshape of the auxiliary voltage is obtained, the amplitude of which corresponds to the amplitude of the individual phase voltages. By means of a curve generator, the shape of the auxiliary voltage can be adapted to the existing conditions.

A constant value, independent of speed variations, of the auxiliary voltage to be superimposed on the voltage reference value is achieved by the provision that the magnitude of the auxiliary voltage and the actual speed voltage formed by the tachometer generator are fed to the inputs of a divider stage in such a manner that the magnitude of the auxiliary voltage is divided by the actual speed value voltage; and that further, the output of the divider stage is connected to one input of a multiplier stage, to the other input of which the current reference value is applied and the output of which is connected to a comparator which precedes that current controller and carries out the reference value/actual value comparison.

Referring to an exemplary embodiment shown in the drawing, the subject of the application will be described in greater detail.

DETAILED DESCRIPTION

Figure 1:
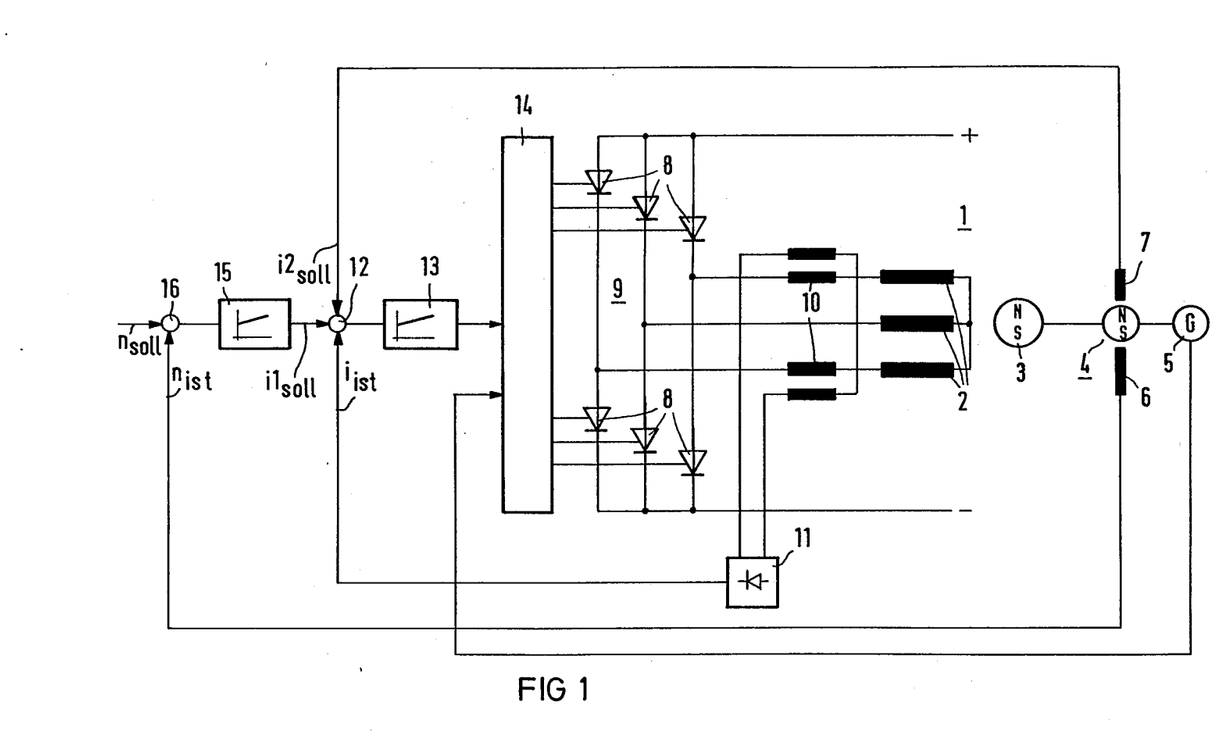
FIG. 1 illustrates, in block diagram form, a driving arrangement according to the invention.

The reference numeral 1 designates a drive motor comprising a stator winding 2 and a permanent magnet-excited rotor 3. A tachometer generator 4 and a pole-wheel position transmitter 5 are coupled to the rotor 3. The tachometer generator 4 and the pole wheel position transmitter 5 have the same number of poles as the drive motor. In addition to a winding 6 furnishing the actual speed voltage, an auxiliary winding 7 is further provided in the stator of the tachometer generator 4 which supplies an auxiliary voltage which is superimposed on the current reference value i1$_{soll}$ as a supplemental reference value i2$_{soll}$.

The stator winding 2 is conncted with its three phase strands to an electronic power stage 9 which consists of controlled semiconductor switching elements 8. With two of the phase strands, the stator winding 2 is connected to the electronic power stage 9 and two phase strands of the stator winding 2 are connected in series with current transformers 10, the secondary sides of which are connected to a rectifier 11. The d-c voltage signal furnished by the rectifier 11 represents the actual current value i$_{ist}$ and is fed to a comparator 12. The comparator 12 receives furthermore a current reference value i1$_{soll}$ furnished by a speed control 15 superimposed on the current controller 13 of the drive motor as well as the supplementary reference value i2$_{soll}$. By the speed control 15, the current reference value is formed on the basis of a comparison carried out on the basis of the further comparator 16 of a preset speed reference value n$_{soll}$ and the actual speed value n$_{ist}$ furnished by the tachometer generator 4.

The differential signal formed by the comparator 12 is connected to the input of a current controller 13, the output of which is connected to one input of a selection-control stage 14. The output of the pole-wheel position transmitter 5 is connected to a further input of the selection control member 14. The control electrodes of the controlled semiconductor switching elements 8 are connected to the outputs of the selection control member 14. By the selection control member 14, the control signal furnished by the current controller 13 is switched in dependence on the control signal of the pole wheel position transmitter 5 to the control electrode of those semiconductor switching elements 8 which must carry current in accordance with the position of the rotor of the drive motor 1.

Figure 2:
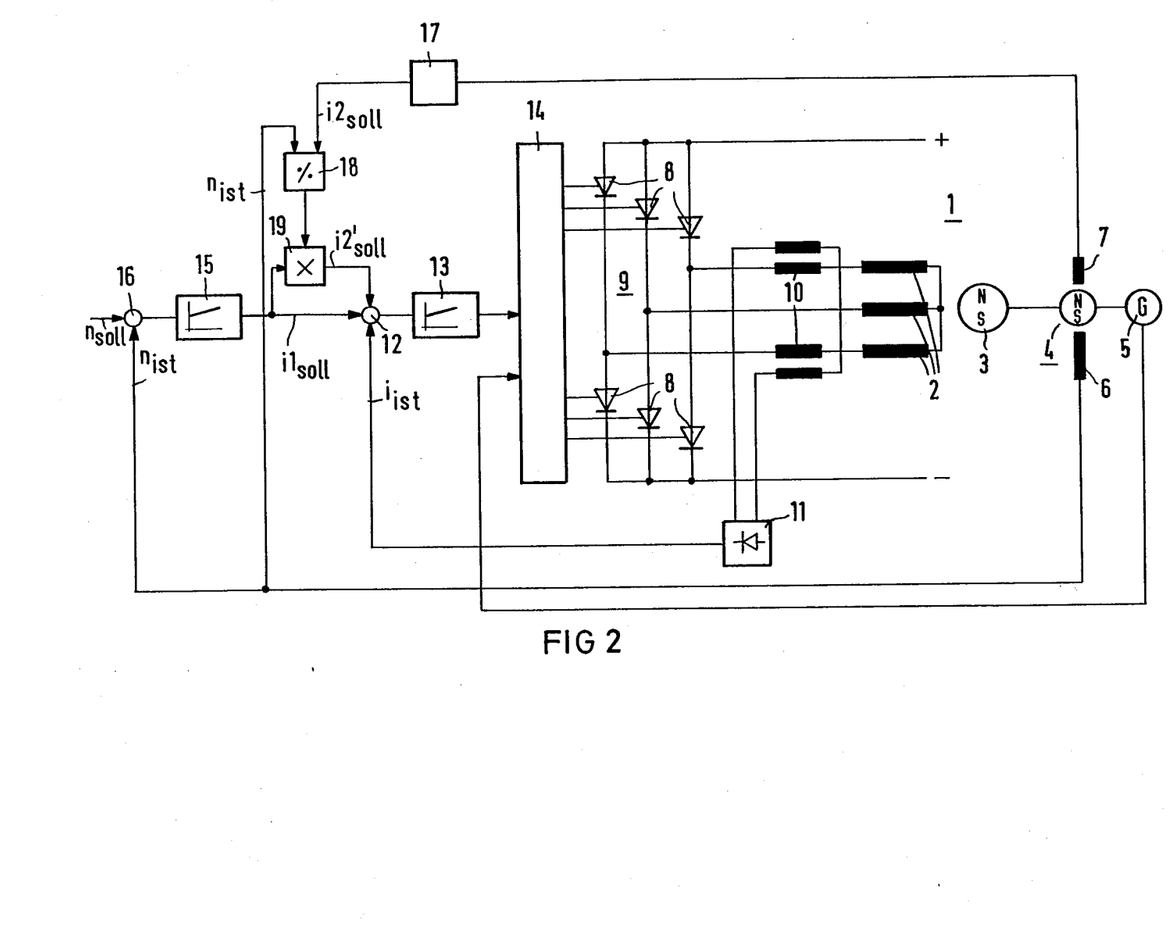
FIG. 2 illustrates, in block diagram form, a driving arrangement with the formation of a quotient from an auxiliary actual-value speed voltage.

In the circuit diagram shown in FIG. 2, the driving arrangement is supplemented by a normalizing stage 17, a divider stage 18, and a multiplier stage 19. Here, the auxiliary voltage furnished by the auxiliary winding 7 is applied to the inputs of the normalizing stage 17, the output of which is connected to one input of the divider stage 18. This input of the divider stage 18 is thereby given the supplemental reference value i2$_{soll}$ suitably matched to the normalizing stage 17. To the other input of the divider stage 18 is connected the actual speed value n$_{ist}$. The output of the divider stage 18 is connected to an input of the multiplier stage 19. To a further input of this multiplier stage 19 is connected the current reference value i1$_{soll}$ furnished by the speed control 15. The corrected supplemental reference value i2'$_{soll}$ appearing at the output of the multiplier stage 19 is fed together with the current reference value i1$_{soll}$ furnished by the speed control 15 to the comparator 12. The differential signal furnished by the comparator 12 again forms the input signal for the current controller 13.

Figure 3:
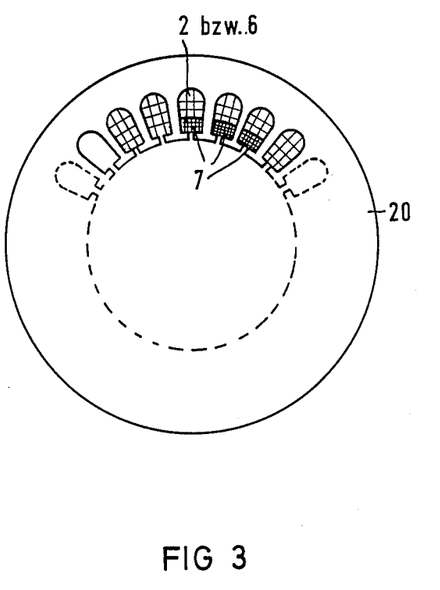
FIG. 3 illustrates the arrangement of the auxiliary winding in a machine stator.
Figure 4:
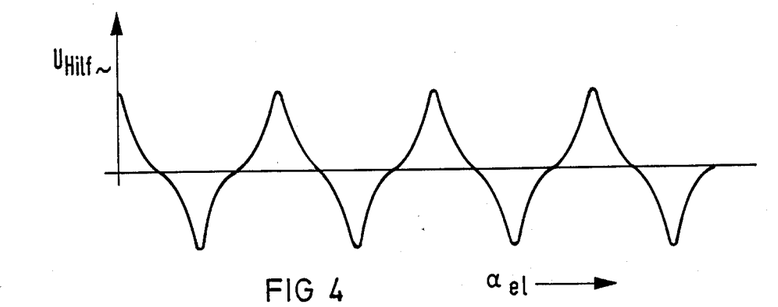
FIG. 4 is a line diagram illustrating the waveshape of the auxiliary voltage in the auxiliary windings.
Figure 5:
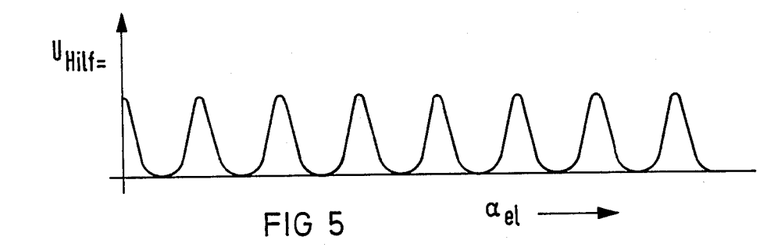
FIG. 5 illustrates the auxiliary voltage shown in FIG. 4 after rectification.
Figure 6:
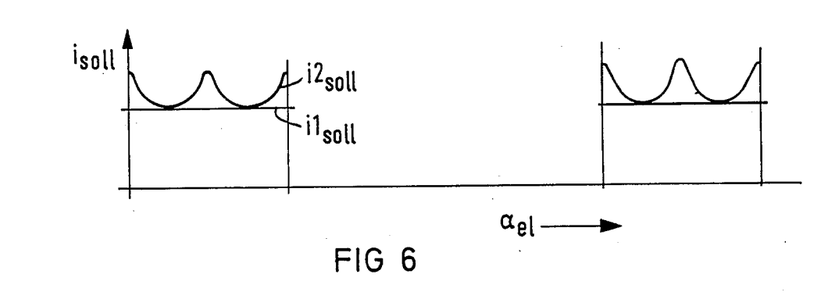
FIG. 6 illustrates a current reference value superimposed by the rectified auxiliary voltage for one phase of the drive motor.

In FIG. 3, the arrangement of the auxiliary winding 7 in the slots of a machine stator 20 is shown. The machine stator 20 can be the stator of the drive motor 1 or the stator of the tachometer generator 4. The auxiliary winding 7 is additionally arranged in the stator slots in addition to the stator winding of the machine in question. By the magnetically excited rotor of the respective machine, a voltage is generated in the individual auxiliary windings 7, the shape of which is shown in FIG. 4. After rectification of this auxiliary voltage, the waveform sketched in FIG. 5 is shown. By the interposition of the rectified auxiliary voltage on the current reference value, the shape shown in a single-phase presentation in FIG. 6 for the current reference value is obtained. Always at the instant of the commutation, the current reference value is increased by the superimposed auxiliary voltage so that then, also the load current is accordingly controlled-upwardly via the current controller.

Because the number of auxiliary windings 7 corresponds to the number of phases of the drive motor and their physical arrangement which is dependent on the pole and phase number of the drive motor, the correct occurrence of the maximum of the auxiliary voltages induced in the auxiliary windings 7 at 111 commutation instants is assured. Thus, the current-reference value is changed properly also by the mere superposition of the auxiliary voltage or the size of the quotient in phase therewith at the correct instant, i.e., at every commutation process.

The driving arrangement according to FIG. 3 is suitable for operation with constant speed. The auxiliary winding 7 can be designed in such a manner that in operation at the nominal speed, the auxiliary voltage induced in the auxiliary windings 7 has a value which is sufficient for a current increase in the commutation range required for compensating the torque breakdown.

The magnitude of the torque breakdown is about the same at all speeds, not counting the inertia behavior of the rotating masses. The auxiliary voltage induced in the auxiliary windings 7, on the other hand, increases proportionally with the speed. In order to assure also in a driving arrangement with variable speed sufficient compensation of the torque breakdown over the full speed range, a constant supplemental reference value $i2'_{soll}$ independent of speed changes for the superposition with the current reference value $i1_{soll}$ is formed by the formation of a quotient of the auxiliary voltage and the actual speed value voltage.

Since the auxiliary voltage as well as the actual speed value voltage change with the speed in the same measure, a constant value independent of the speed is obtained for correcting the current reference value by the above-mentioned quotient formation. Since the actual speed value voltage is constant at its respective level, the waveform of the signal at the output of the divider stage 18 completely corresponds to the waveform of the auxiliary voltage. Thus, also the output signal $i2'_{soll}$ of the multiplier stage has its maximum value in the correct position at every commutation instant, whereby the current reference value $i1_{soll}$ is increased accordingly.

Figure 7:
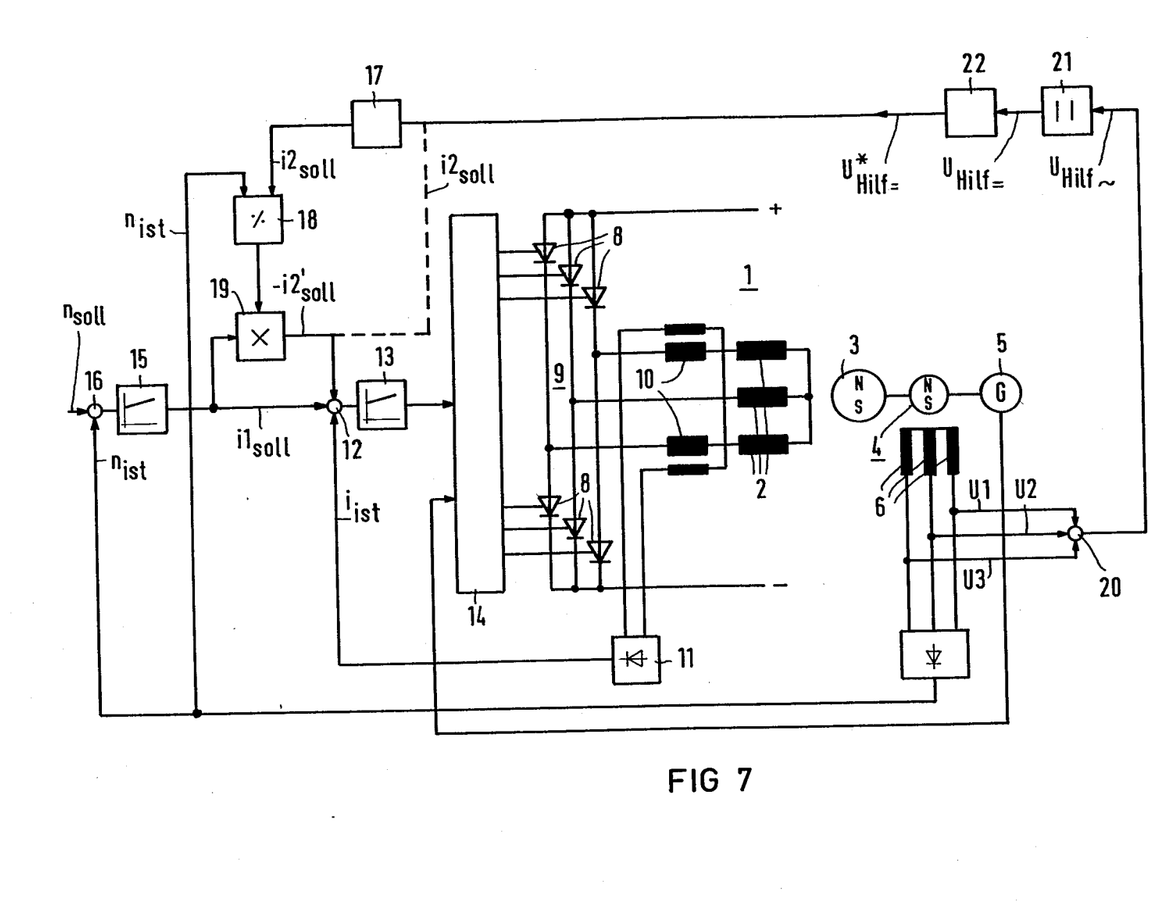
FIG. 7 illustrates, in block diagram form, a driving arrangement in which an auxiliary voltage is formed from the three-phase voltage of a tachometer generator.

In the embodiment example shown in FIG. 7, the winding 6 of the tachometer generator 4 coupled to the rotor 3 is realized in three phases.

Figure 8:
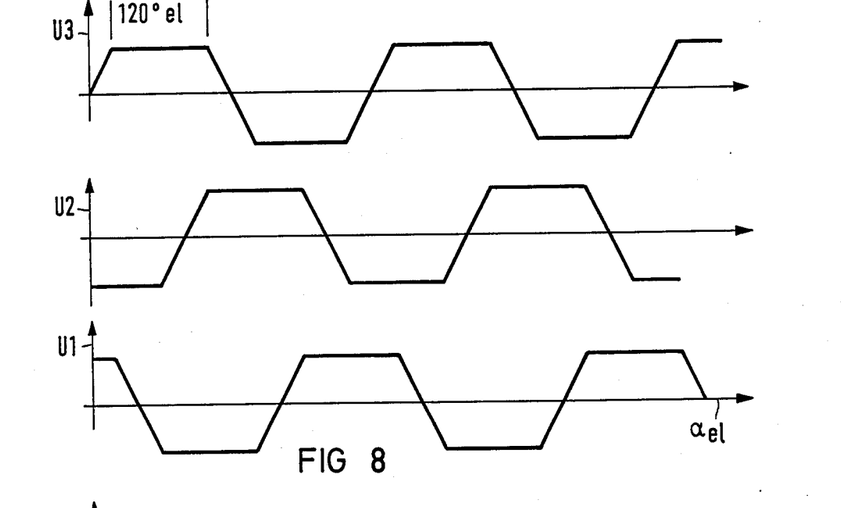
FIG. 8 is a line diagram illustrating the shape of the three voltages of the tachometer generator.
Figure 9:
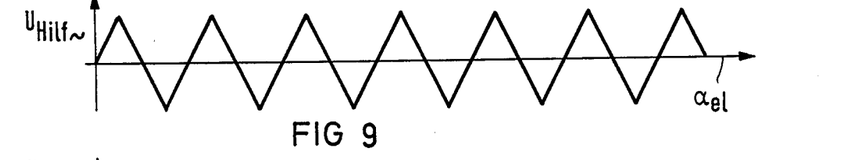
FIG. 9 is a line diagram illustrating the waveshape of the auxiliary voltage formed by the summation of the three tachometer voltages.
Figure 10:
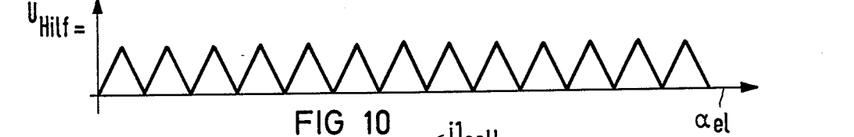
FIG. 10 illustrates the auxiliary voltage shown in FIG. 9 after rectification.

As is shown in FIG. 8, the phase voltages U1, U2, U3 of the tachometer generator 4 have a trapezoidal waveform. The constant region of these phase voltages U1 to U3 extends over 120°. It is achieved thereby that the regions of the individual phase voltages extending at an angle do not overlap in time. The addition of these three phase voltages U1 to U3 by means of a summing stage 20 furnishes a single-phase auxiliary voltage $U_{Hilf\sim}$, the waveform of which is shown in FIG. 9. Of this auxiliary voltage $U_{Hilf\sim}$, the amplitude 1s formed by means of an amplitude former 21, for instance, a rectifier diode. The waveform of the amplitude of the auxiliary voltage $U_{Hilf=}$ is shown in FIG. 10. By means of a function generator 22 connected to the amplitude former 21, the shape of the auxiliary voltage can be varied to obtain optimum control.

The auxiliary voltage $U_{Hilf=}$ and $U^*_{Hilf=}$, respectively, represents the supplemental reference value to be fed to the comparator 12.

Figure 11:
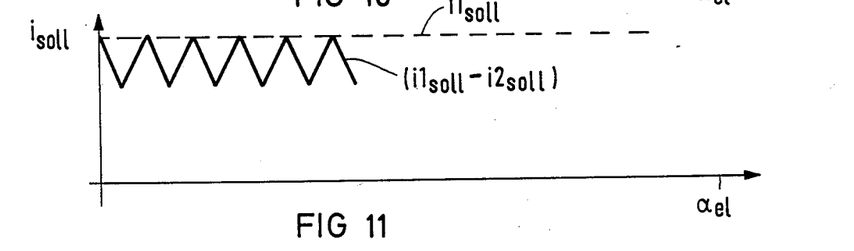
FIG. 11 illustrates the waveshape of the current reference value formed by substraction of the rectified auxiliary voltage.

If the driving arrangement operates at constant speed, the auxiliary voltage can be fed to the comparator 12 directly as the supplemental reference value $i2_{soll}$, as indicated in dashed lines in FIG. 7. Since the supplemental reference value $i2_{soll}$ must be subtracted from the current reference value $i1_{soll}$, a corresponding subtraction stage is provided in the comparator 12. It is also possible to feed the supplemental reference value $i2_{soll}$ to the comparator 12 with negative sign. By subtracting the supplemental reference value $i2_{soll}$ from the current reference value $i1_{soll}$, a current reference value $i_{soll}$ is obtained which, as is shown in FIG. 11, has pronounced maxima and minima where at every commutation instant, a maximum of the current reference value occurs so that the load current is regulated-up at this instant.

The magnitude of the torque breakdown during the commutation phase is approximately the same at all speeds, not counting the inertia behavior of the rotating masses. The voltages induced in the three-phase stator winding 6 of the tachometer generator 4 increase proportionally to the speed. Thus, the magnitude of the auxiliary voltage $U_{Hilf}$ formed from these voltages is proportional to the speed. In order to assure also in a driving arrangement operating with variable speed, sufficient compensation of the torque breakdown over the full speed range, it is necessary to keep the magnitude of the supplemental reference value $i2_{soll}$ constant.

The amplitude of the auxiliary voltage $U_{Hilf=}$ is therefore fed to the normalizing stage 17. The divider stage 18 connected thereto thus obtains at its one input again the supplemental reference $i2_{soll}$ correspondingly matched by the normalizing stage 17, and at its other input the actual speed value $n_{ist}$, as with the circuit shown in FIG. 2, the multiplier stage 19 then furnishes the corrected supplemental reference value $i2'_{soll}$. The corrected supplemental reference value $i2'_{soll}$ can be provided here with a negative sign by multiplication with $-1$.

By forming the quotient from the auxiliary voltage $U_{Hilf}$ and the actual speed value voltage, one again obtains a value independent of the speed for correcting the current reference value, of which the waveform corresponds completely to the waveform of the auxiliary voltage. Thereby, also the output signal $i2'_{soll}$ of the multiplier stage 19 has at any commutation instant a minimum value with the correct position which leads, by subtraction from the current reference value $i1_{soll}$ to an increase of the current reference value fed to the current controller 13 during the commutation phase.

What is claimed is:

1. In a driving arrangement for a drive motor, which driving arrangement includes a current controller to control semiconductor switching elements of an electronic power stage associated with said drive motor; said control being in accordance with the output of a rotor position transmitter coupled to the rotor of said drive motor, an improvement, which comprises:
   (a) a predetermined number of auxiliary windings being arranged about a magnetically excited rotor;

(b) said predetermined number corresponding to the number of phases of said drive motor;

(c) said magnetically excited rotor having a pole position corresponding to the output of said rotor position transmitter;

(d) said auxiliary windings being physically spaced from one another by an angle equal to 360°/2pm, where p corresponds to the number of pole pairs of said drive motor and m corresponds to the number of phases of said drive motor;

(e) said magnetically excited rotor causing an induced auxiliary voltage in said auxiliary windings;

(f) means for generating a current reference value ($9i1_{soll}$); and (g) means for superimposing a value representative of said induced auxiliary voltage ($i2_{soll}$) onto said current reference value ($i1_{soll}$); said means being coupled to said current controller.

2. In a driving arrangement for a drive motor, which driving arrangement includes a current controller to control semiconductor switching elements of an electronic power stage associated with said drive motor; said control being in accordance with the output of a rotor position transmitter coupled to the rotor of said drive motor, and further, a tachometer generator coupled to the rotor of said drive motor, an improvement, which comprises:

(a) said tachometer generator including a multiphase stator winding;

(b) the number of phases of said multiphase stator winding corresponding to the number of phases of said drive motor;

(c) said tachometer generator being operable to induce a voltage in each phase; each of said voltages being constant for at least a predetermined angular range;

(d) each of said voltages periodically changing from one polarity to another polarity in such a manner wherein the angular ranges over which said voltages change polarity are spaced from an overlapping relation in time relative to each other;

(e) summing means to sum said voltages to provide an auxiliary voltage;

(f) means for generating a current reference value;

(g) means for substracting an amplitude value representative of said auxiliary voltage ($U_{Hilf\sim}$) from said current reference value; said means being coupled to said current controller.

3. The driving arrangement of claim 1, wherein the auxiliary windings are arranged in the stator of the drive motor and are induced by the rotor field of the drive motor.

4. The driving arrangement of claim 1, and further a speed control means having an output superimposed to the current controller and a tachometer generator having a voltage output representative of actual speed value; said auxiliary windings being arranged in the stator of said tachometer generator and being induced by the rotor field of said tachometer generator.

5. The driving arrangement according to either of claims 1, 3 or 4, wherein said auxiliary windings are connected in series.

6. The driving arrangement of claim 4, wherein the amplitude of the auxiliary voltage of said tachometer generator being matched to the level of said voltage output representative of actual-speed value and each of said voltages being inputed to a divider stage in such a manner that the auxiliary voltage is divided by the voltage output representative of actual-speed value; and further, the output of said divider stage being connected to one input of a multiplier stage, the current reference value ($i1_{soll}$) being coupled to the other input of said multiplier stage; the output of said multiplier stage being connected to a comparator operable to compare such output of the multiplier stage and said current reference value; said computer being coupled to the current controller.

7. The driving arrangement of claim 6, wherein said auxiliary windings being designed such that the crest value of the auxiliary voltage induced therein is approximately equal to the level of the voltage output representative of actual-speed value.

8. The driving arrangement of claim 6, wherein the auxiliary voltage is fed to said divider stage via a normalizing stage.

9. The driving arrangement of claim 2, wherein said drive motor is a three-phase drive motor, and said predetermined angular range of each of said individual phase voltages of the tachometer generator extends over 120°.

10. The driving arrangement of either claims 2 or 9, wherein the waveshape of the magnitude of the auxiliary voltage ($U_{Hilf=}$) is changed by means of a function former.

11. The driving arrangement of either claims 2 or 9, wherein the magnitude of the auxiliary voltage and a voltage representative of actual-speed value generated by the tachometer are fed to the input of a divider stage in such a manner that the magnitude of the auxiliary voltage is divided by the voltage representative of actual-speed value; and further, the output of the divider stage being coupled to one input of a multiplier stage; said current reference value being inputed to the other input of the multiplier stage and the output of said multiplier stage being coupled to a comparator operable to compare said output of the multiplier stage and said current reference value; said comparator being coupled to the current controller.

* * * * *